(12) United States Patent
Kopecek

(10) Patent No.: US 12,196,277 B2
(45) Date of Patent: Jan. 14, 2025

(54) ROTARY ELECTROMAGNETIC LOCKING ACTUATOR

(71) Applicant: Woodward, Inc., Fort Collins, CO (US)

(72) Inventor: Joseph Thomas Kopecek, Santa Clarita, CA (US)

(73) Assignee: Woodward, Inc., Fort Collins, CO (US)

( * ) Notice: Subject to any disclaimer, the term of this patent is extended or adjusted under 35 U.S.C. 154(b) by 220 days.

(21) Appl. No.: 17/811,458

(22) Filed: Jul. 8, 2022

(65) Prior Publication Data

US 2024/0011533 A1    Jan. 11, 2024

(51) Int. Cl.
*F16D 63/00* (2006.01)
*F16H 19/02* (2006.01)
*F16H 19/08* (2006.01)

(52) U.S. Cl.
CPC .......... *F16D 63/006* (2013.01); *F16H 19/02* (2013.01); *F16H 19/08* (2013.01)

(58) Field of Classification Search
CPC . F16H 37/082; F16H 3/64; F16H 3/62; F16H 25/2454; F16D 63/006
USPC ........................................................ 475/323
See application file for complete search history.

(56) References Cited

U.S. PATENT DOCUMENTS

| | | | |
|---|---|---|---|
| 4,240,332 A | 12/1980 | Deutsch | |
| 4,463,661 A | 8/1984 | Tootle | |
| 4,603,594 A | 8/1986 | Grimm | |
| 4,703,683 A | 11/1987 | Sue | |
| 4,742,758 A | 5/1988 | Della Rocca | |
| 4,785,718 A | 11/1988 | Hata et al. | |
| 5,074,832 A * | 12/1991 | Igaku | F16H 3/54 475/335 |
| 5,267,760 A | 12/1993 | Carlin | |
| 5,974,841 A | 11/1999 | Naganuma | |
| 6,863,518 B2 | 3/2005 | Powers | |
| 8,234,894 B2 | 8/2012 | Taniguchi et al. | |
| 8,316,632 B2 | 11/2012 | West et al. | |

(Continued)

FOREIGN PATENT DOCUMENTS

| | | |
|---|---|---|
| CA | 2762397 | 6/2012 |
| DE | 29621925 | 2/1997 |

(Continued)

OTHER PUBLICATIONS

International Preliminary Report on Patentability for International Appln. No. PCT/US2021/059685, mailed on Jun. 15, 2023, 13 pages.

(Continued)

*Primary Examiner* — Randell J Krug
(74) *Attorney, Agent, or Firm* — Fish & Richardson P.C.

(57) ABSTRACT

The subject matter of this specification can be embodied in, among other things, a rotary lock assembly includes an epicyclic gear assembly having a sun gear assembly, a ring gear assembly, and a planet gear assembly having a collection of planet gears mechanically engaged to the sun gear assembly and the ring gear assembly, and a planet carrier mechanically engaged to the planet gears and configured to be rotated by the planet gears, a lock rotor configured to be rotated by the ring gear assembly, and a rotary output assembly configured to be rotated by the planet carrier.

20 Claims, 8 Drawing Sheets

(56) References Cited

U.S. PATENT DOCUMENTS

| | | |
|---|---|---|
| 8,715,132 B2 | 5/2014 | Kopecek |
| 8,904,751 B2 | 12/2014 | Howarth et al. |
| 8,932,176 B2 | 1/2015 | Kopecek |
| 9,200,697 B1 * | 12/2015 | Gauthier ............... F16H 57/10 |
| 9,366,201 B2 | 6/2016 | Caruel |
| 9,863,518 B2 | 1/2018 | Kurth |
| 10,767,412 B2 | 9/2020 | Scheuring et al. |
| 11,473,658 B2 | 10/2022 | Kopecek |
| 11,608,878 B2 | 3/2023 | Kopecek |
| 2003/0171185 A1 | 9/2003 | Potter et al. |
| 2009/0090203 A1 | 4/2009 | Jones et al. |
| 2013/0152717 A1 | 6/2013 | Kopecek |
| 2015/0176679 A1 | 6/2015 | Lohmann et al. |
| 2016/0097407 A1 | 4/2016 | Kopecek |
| 2019/0024728 A1 | 1/2019 | Balogh et al. |
| 2020/0165856 A1 | 5/2020 | Scheuring et al. |
| 2022/0107004 A1 | 4/2022 | Pereira Lemos |
| 2022/0170536 A1 | 6/2022 | Kopecek |
| 2022/0389992 A1 | 12/2022 | Kopecek |

FOREIGN PATENT DOCUMENTS

| | | |
|---|---|---|
| EP | 0914938 | 5/1999 |
| GB | 2435877 | 9/2007 |

OTHER PUBLICATIONS

International Search Report and Written Opinion for International Appln. No. PCT/US2023/027049, mailed on Sep. 27, 2023, 22 pages.

International Search Report and Written Opinion for International Appln. No. PCT/US2021/059658, dated Mar. 30, 2022, 22 pages.

Invitation to Pay Additional Fees for International Appln. No. PCT/US2021/059685, dated Feb. 7, 2022, 16 pages.

* cited by examiner

ROTARY ELECTROMAGNETIC LOCKING ACTUATOR

TECHNICAL FIELD

This instant specification relates to mechanically lockable rotary actuators, more particularly, rotary actuator that have positive engagement.

BACKGROUND

Conventional technologies used to lock rotary actuators use a motor brake to "lock" a rotary actuator. Motor brakes typically use spring loaded brake plates with solenoid actuation. However, the conventional motor brake design has known shortcomings. A motor brake is not a genuine lock because it does not have a positive mechanical engagement (i.e., direct mechanical interference) with the actuator's rotor output shaft. A motor brake is also dependent on the coefficient of friction between the plates. The coefficient of friction can have a large decrease if the brake plates are contaminated with oil, water, dust etc. This results in a loss of load carrying capability if brake plates are contaminated.

Brakes are not acceptable for locking safety critical applications such as aircraft flight controls, landing gear actuation, thrust reversers, doors etc. Many aircraft manufacturers' actuator specifications expressly forbid the use of locking elements that have a dependency on a coefficient of friction.

Alternatively, linear solenoid-operated pin locks have been used to prevent the rotation of a rotary actuator's output shaft. Solenoid operated pin locks require controls for the solenoid. Additionally, linear solenoids have a relatively short stroke. As the solenoid stroke increases, the size of the solenoid coil increases exponentially, adding weight that may be undesirable especially in aerospace applications.

SUMMARY

In general, this document describes automatically locking and unlocking rotary actuators that have positive engagement.

In a general example embodiment, a rotary lock assembly includes an epicyclic gear assembly having a sun gear assembly, a ring gear assembly, and a planet gear assembly having a collection of planet gears mechanically engaged to the sun gear assembly and the ring gear assembly, and a planet carrier mechanically engaged to the planet gears and configured to be rotated by the planet gears, a lock rotor configured to be rotated by the ring gear assembly, and a rotary output assembly configured to be rotated by the planet carrier.

Various embodiments can include some, all, or none of the following features. The rotary lock assembly can include a lock key configured for radial displacement between a first lock key configuration and a second lock key configuration, where the lock rotor can be configured to be rotated by the ring gear assembly between a first lock rotor configuration in which radial displacement of the lock key from the first lock key configuration to the second lock key configuration is prevented, and a second lock rotor configuration in which radial displacement of the lock key from the first lock key configuration to the second lock key configuration is permitted. The rotary lock assembly can include a first lock rotor stop configured to prevent rotation of the lock rotor in a first direction at the first lock rotor configuration, and a second lock stop configured to prevent rotation of the lock rotor in a second direction at the second lock rotor configuration. The rotary output assembly can be configured for rotary movement relative to radial movement of the lock key, and having an outer surface defining a recess between a first rotational recess face and a second rotational recess face, and configured to receive the lock key in the first lock key configuration and be prevented from rotating based on mechanical interference between the lock key and at least one of the first rotational recess face and the second rotational recess face. The rotary lock assembly can include a housing and a key guide grounded to the housing and having a radial slot configured to provide radial guidance for the radial displacement of the lock key and prevent rotational movement of the lock key within the housing. The rotary lock assembly can include a bias member configured to bias rotation of the lock rotor toward the first lock rotor configuration. The sun gear assembly can be configured to be rotated by a rotary power source. The ring gear assembly can include the lock rotor. The rotary lock assembly can include an electric motor configured to urge rotation of the sun gear assembly.

In general example implementation, a method of locking a linear actuator includes receiving torque at a sun gear assembly of an epicyclic gear assembly, transmitting torque from the sun gear assembly to a ring gear assembly of the epicyclic gear assembly through a collection of planet gears of a planet gear assembly of the epicyclic gear assembly, urging rotation of a lock rotor based on rotation of the ring gear assembly, urging rotation of a planet carrier by orbital motion of the planet gears about the sun gear assembly, and transmitting torque from the planet carrier to a rotary output assembly.

Various implementations can include some, all, or none of the following features. The method can include urging radial displacement of a lock key from a first lock key configuration to a second lock key configuration based on rotary movement of the rotary output assembly. The method can include contacting, based on movement of the rotary output assembly, the lock key with an radial groove face of a groove defined in the rotary output assembly and configured to receive the lock key in the first lock key configuration, preventing rotary movement of the rotary output assembly based on interference between the lock key and the radial groove face, preventing rotation of the planet gear assembly based on the prevented rotary movement of the rotary output assembly, and transmitting substantially all torque received at the sun gear assembly to the ring gear assembly. The method can include rotating the lock rotor from a first lock rotor configuration to a second lock rotor configuration. The first lock rotor configuration can be a first rotational position defined by a first lock rotor end stop configured to interfere with rotation of the lock rotor in a first direction, and the second lock rotor configuration can be a second rotational position defined by a second lock rotor end stop configured to interfere with rotation of the lock rotor in a second direction opposite the first direction. The lock rotor can be configured to prevent radial displacement of a lock key from a first key configuration to a second key configuration in the first lock rotor configuration, and can be configured to permit radial displacement of the lock key from the first key configuration to the second key configuration in the second lock rotor configuration. The method can include providing, by an electric motor, torque at the sun gear assembly.

In another general embodiment, a rotary actuator includes a housing, a rotary input member rotatably moveable relative to the housing, a rotary output member rotatably moveable between a first output position relative the housing, and a second output position relative to the housing, and a rotary lock assembly disposed within the housing and constrained from rotary motion, the rotary lock assembly having a first epicyclic gear assembly having a sun gear assembly, a ring gear assembly, and a planet gear assembly having a collection of planet gears mechanically engaged to the sun gear assembly and the ring gear assembly, and a planet carrier mechanically engaged to the planet gears and configured to be rotated by the planet gears, a lock rotor configured to be rotated by the ring gear assembly, and a rotary output assembly configured to be rotated by the planet carrier.

Various embodiments can include some, all, or none of the following features. The rotary lock assembly can include a lock key configured for radial displacement between a first lock key configuration and a second lock key configuration, wherein the lock rotor can be configured to be rotated by the ring gear assembly between a first lock rotor configuration in which radial displacement of the lock key from the first lock key configuration to the second lock key configuration is prevented, and a second lock rotor configuration in which radial displacement of the lock key from the first lock key configuration to the second lock key configuration is permitted. The rotary lock assembly can include a first lock rotor stop configured to prevent rotation of the lock rotor in a first direction at the first lock rotor configuration, and a second lock stop configured to prevent rotation of the lock rotor in a second direction at the second lock rotor configuration. The rotary output member can be configured for rotary movement relative to radial movement of the lock key, and the rotary output member can include an outer surface defining a groove between a first radial groove face and a second radial groove face, and configured to receive the lock key in the first lock key configuration and be prevented from rotating based on mechanical interference between the lock key and at least one of the first radial groove face and the second radial groove face. The rotary actuator can include an electric motor configured to urge rotation of the sun gear assembly.

The systems and techniques described here may provide one or more of the following advantages. First, a system can provide a rotary actuator having automatic locking and unlocking. Second, the system can perform the locking and unlocking powered by rotation of a motor, without the need for electromechanical components. Third, the system can provide positive engagement that does not rely on friction. Fourth, the system can provide configurable gear ratios between a rotary input and a rotary output.

The details of one or more implementations are set forth in the accompanying drawings and the description below. Other features and advantages will be apparent from the description and drawings, and from the claims.

DETAILED DESCRIPTION

This document describes systems and techniques for automatically locking and unlocking rotary actuators that have positive engagement. The described systems and techniques are not dependent upon a coefficient of friction, and do not require separate lock actuation solenoids. In general, a mechanical locking mechanism is integrated into an epicyclic gearbox, and is activated and deactivated automatically based on torques that are transmitted through the gearbox. In very general terms, when a rotary output is locked and effectively grounded, torque from a rotational input (e.g., a motor) gets transmitted to a rotating lock, rotating the lock into hard stop in a positon that permits unlocking. With the rotating lock effectively grounded at the unlocking position, torque from the rotational input gets transmitted to the unlocked rotary output.

Figure 1:
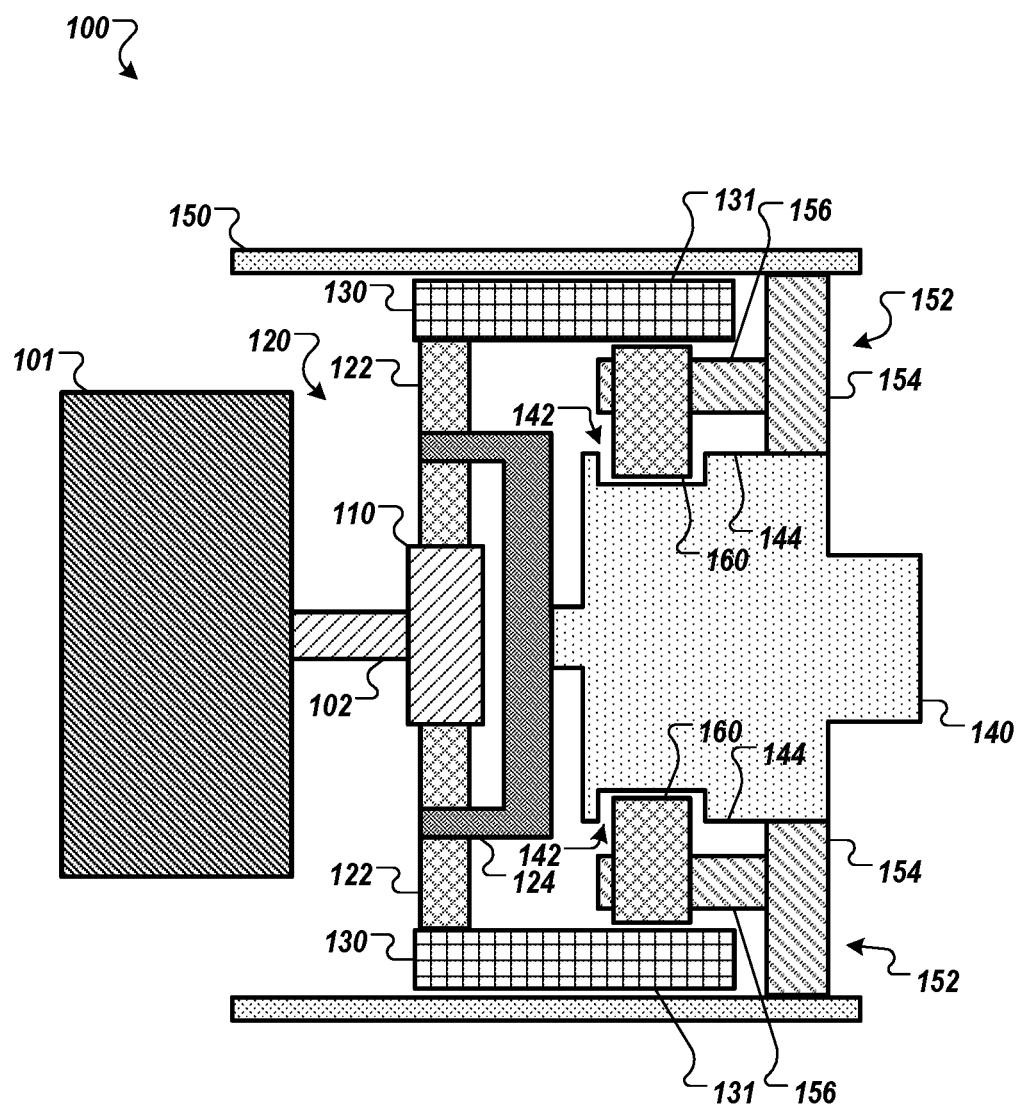
FIG. 1 shows a longitudinal cross section view of an example locking rotary actuator assembly in a locked configuration.

FIG. 1 shows a longitudinal cross section view of an example locking rotary actuator assembly 100 in a locked configuration. The assembly 100 includes a motor 101. In some embodiments, the motor 101 can be an electric motor, a fluid motor, or any other appropriate rotary input member or device that can provide torque and/or rotational motion. In the illustrated example, the motor 101 is connected directly to a sun gear assembly 110 by a shaft 102, such that the motor can urge rotation of the sun gear assembly 110. In some embodiments, the motor 101 can be indirectly coupled to the sun gear assembly 110. For example, the motor 101 can drive the shaft 102 and/or the sun gear through a gearbox, a pulley system, a universal joint, a flex shaft, a rack and pinion assembly, or any other appropriate mechanism that can transmit torque, linear motion, and/or force to urge rotation of the sun gear assembly 110.

The sun gear assembly 110 is mechanically coupled to a planet gear assembly 120 that includes a collection of planet gears 122 and a planet carrier 124. For example, rotation of the sun gear assembly 110 can urge rotation of the planet gears 122, or it can cause the planet gears 122 to orbit the sun gear assembly 110 and urge rotation of the planet carrier 124, or a combination of both actions, as will be discussed in more detail below.

The planet gear assembly 120 is mechanically coupled to a ring gear assembly 130. The ring gear assembly 130 is configured to rotate a lock rotor assembly 131 in response to action of the planet gear assembly 120. The ring gear assembly is configured to rotate through a predetermined range of motion (e.g., a partial rotation), limited by hard stops (not shown) at a predetermined clockwise position and at a predetermined counterclockwise position. When at a limit of rotational motion, the ring gear assembly 130 effectively becomes grounded against further movement in that direction, and substantially all of the torque from the motor 101 is transmitted through the planet carrier 124 to a rotary output assembly 140. Conversely, when the rotary output assembly 140 is grounded, substantially all of the torque from the motor 101 is transmitted through the planet gears 122 to the ring gear assembly 130. When neither the rotary output assembly 140 nor the ring gear assembly 130 are grounded, torque from the motor 101 is shared between the rotary output assembly 140 and the ring gear assembly 130 urging rotation of both.

The assembly 100 includes a housing 150. In some embodiments, the housing 150 is affixed to and substantially mechanically grounded relative to rotation of the sun gear assembly 110 and/or the rotary output assembly 140. A housing cap assembly 152 is removably affixed to the housing 150. The housing cap assembly 152 includes an endcap 154 and a key guide assembly 156. In some embodiments, the endcap 154 can prevent intrusion by foreign objects (e.g., loose parts, debris, fingers) into the internal workings of the assembly 100. The key guide assembly 156 will be discussed in more detail below.

The assembly 100 also includes a collection of lock keys 160. The lock keys 160 are configured to move radially inward and outward relative to the rotary output assembly 140 to selectably lock and unlock the rotary output assembly 140 to selectably prevent and permit rotation of the rotary output assembly 140. In the illustrated configuration, the lock keys 160 are recessed into a collection of recesses 142 defined in an outer surface 144 of the rotary output assembly 140. The operation and configuration of the lock keys 160 will be discussed in more detail below. The epicyclic gearbox formed by the sun gear assembly 110, the planet gear assembly 120, the ring gear assembly 130 and the housing 150 combine to provide the functions a rotary lock assembly.

Figure 2:
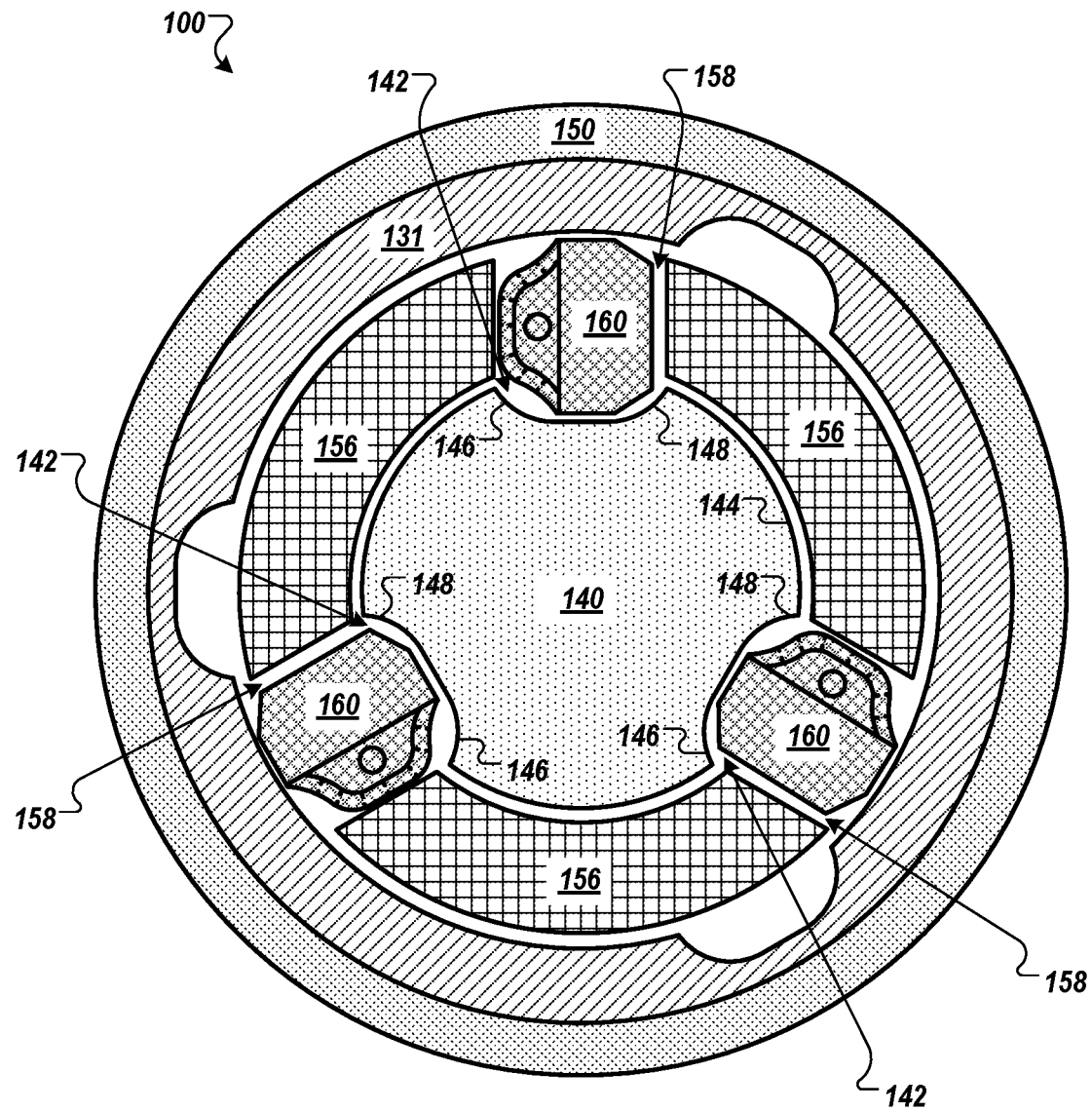
FIG. 2 shows an axial cross section view of the example locking rotary actuator assembly of FIG. 1.

FIG. 2 shows an axial cross section view of the example locking rotary actuator assembly 100 in the example configuration shown in FIG. 1. In the illustrated example, the lock keys 160 are retained within the recesses 142 defined in the outer surface 144. Each of the recesses 142 is defined between a rotational recess face 146 and a rotational recess face 148, and provides a space to accommodate partial radial insertion of the lock key 160. The key guide assembly 156 includes a collection of guide slots 158 defined as radial slots or apertures (e.g., radial relative to the rotary output assembly 140) configured to provide radial guidance for movement of the lock keys 160. The guide slots 158 are sized to permit radial movement of the lock keys 160, but prevent rotational or orbital movement of the lock keys 160 (e.g., about the rotary output assembly 140).

In the illustrated "locked" configuration, radial movement of the lock keys 160 away from the rotary output assembly 140 and escapement of the lock keys 160 from the recesses 142 is prevented by the lock rotor assembly 131, which concentrically surrounds the key guide assembly 156. Rotation of the rotary output assembly 140 is prevented, as such rotation would cause mechanical interference between the lock keys 160 and the rotational recess faces 146 and/or 148. Since the lock keys 160 are substantially unable to move in the illustrated configuration, rotation of the rotary output assembly 140 is substantially prevented (e.g., locked).

Figure 3:
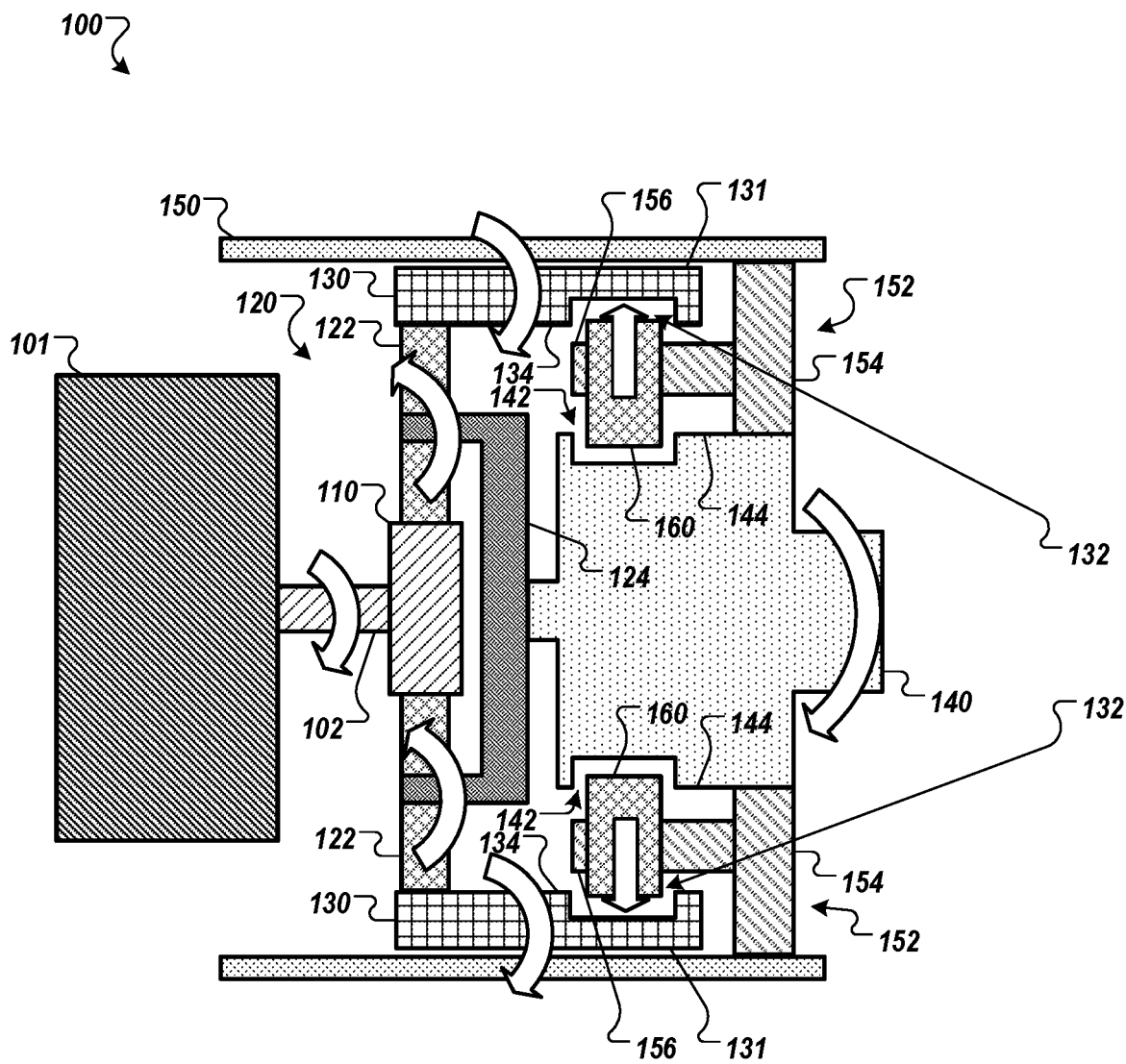
FIG. 3 shows a longitudinal cross section of the example locking actuator assembly of FIG. 1 during an unlocking process.
Figure 4:
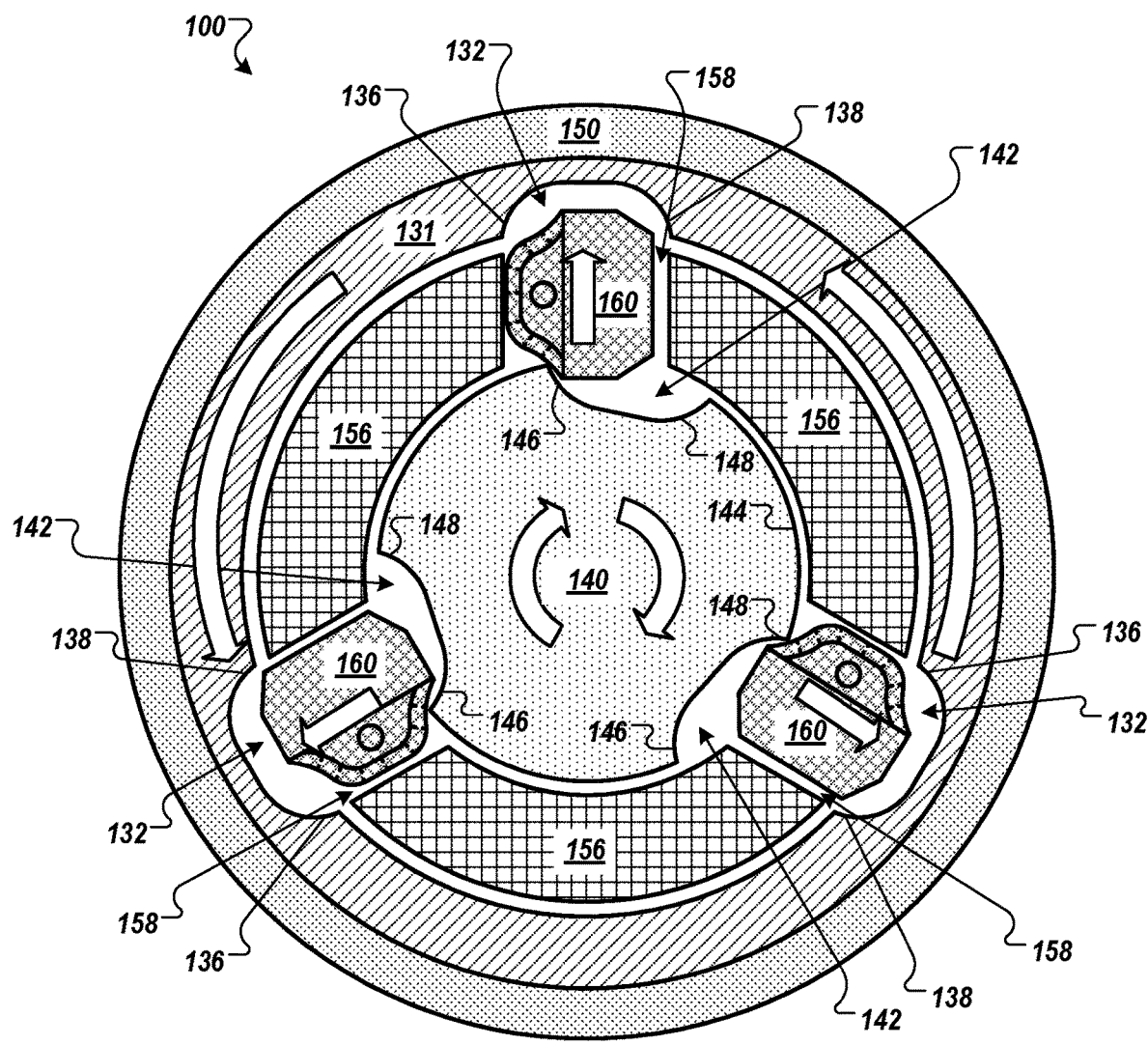
FIG. 4 shows an axial cross section view of the example locking rotary actuator assembly of FIG. 3.

FIGS. 3 and 4 show a longitudinal cross section and an axial cross section, respectively, of the example locking rotary actuator assembly 100 during an example unlocking process. During unlocking, the motor 101 is energized to urge rotation of the shaft 102 and the sun gear assembly 110.

Since the rotary output assembly 140 is substantially locked at the start of the unlocking process, and the planet carrier 124 is coupled to the rotary output assembly 140, the planet carrier 124 is substantially grounded in this configuration as well. With the planet carrier 124 grounded, rotation of the sun gear assembly 110 urges rotation (e.g., but not orbit) of the planet gears 122.

Rotation of the planet gears 122 urges rotation of the lock rotor assembly 131. The lock rotor assembly 131 includes a collection of recesses 132. The recesses 132 are defined in an inner surface 134 of the lock rotor assembly 131. Each of the recesses 132 is defined between a rotational recess face 136 and a rotational recess face 138, and provides a space to accommodate partial radial insertion of the lock key 160.

Rotation of the lock rotor assembly 131 rotates the recesses 132 into radial alignment with the guide slots 158 and the lock keys 160. A lock rotor stop (not shown) is configured to stop rotation of the lock rotor assembly 131 at the point of alignment (e.g., an unlocked lock rotor configuration). In some embodiments, the lock rotor assembly 131 can be configured to have a predetermined amount of angular travel relative to the housing (e.g., about 15 degrees). Another lock rotor stop (not shown) is configured to stop rotation of the lock rotor assembly 131 in a locked lock rotor configuration in which the recesses 132 are not aligned with the guide slots 158. In some embodiments, when the lock rotor assembly 131 is hard stopped in an unlocked lock rotor configuration, the ring gear assembly 130 becomes substantially grounded in that direction, substantially preventing static rotation of the planet gears 122 and urging rotation of the planet carrier 124, which in turn urges rotation of the rotary output assembly 140.

With the recesses in alignment with the guide slots 158, the lock keys 160 are provided with additional space in which they can move radially away from the rotary output assembly 140. The mechanical contact between the lock keys 160 and the rotational recess faces 146, 148 that initially prevented further rotation of the rotary output assembly 140 (e.g., because the lock keys 160 were previously prevented from moving radially), can now urge radial displacement of the lock keys 160 out of the recesses 132 and into the recesses 142. The rotational recess faces 146, 148 are ramped or angled to urge the lock keys 160 radially outwards thus completing the unlocking action. As the lock keys 160 escape the recesses 142, the rotary output assembly 140 is permitted to rotate further.

Figure 5:
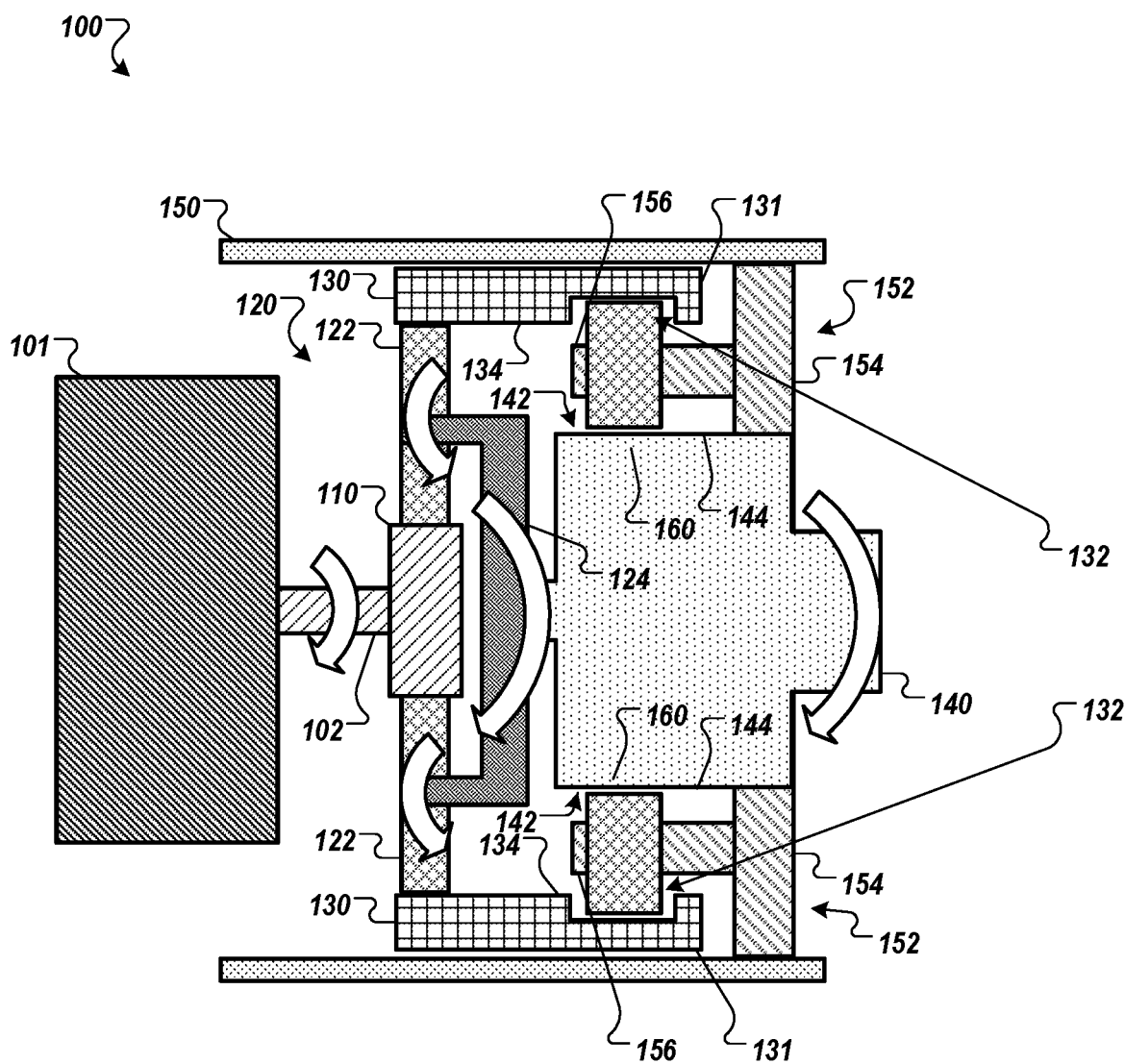
FIG. 5 shows a longitudinal cross section of the example locking actuator assembly of FIG. 1 in an unlocked configuration.
Figure 6:
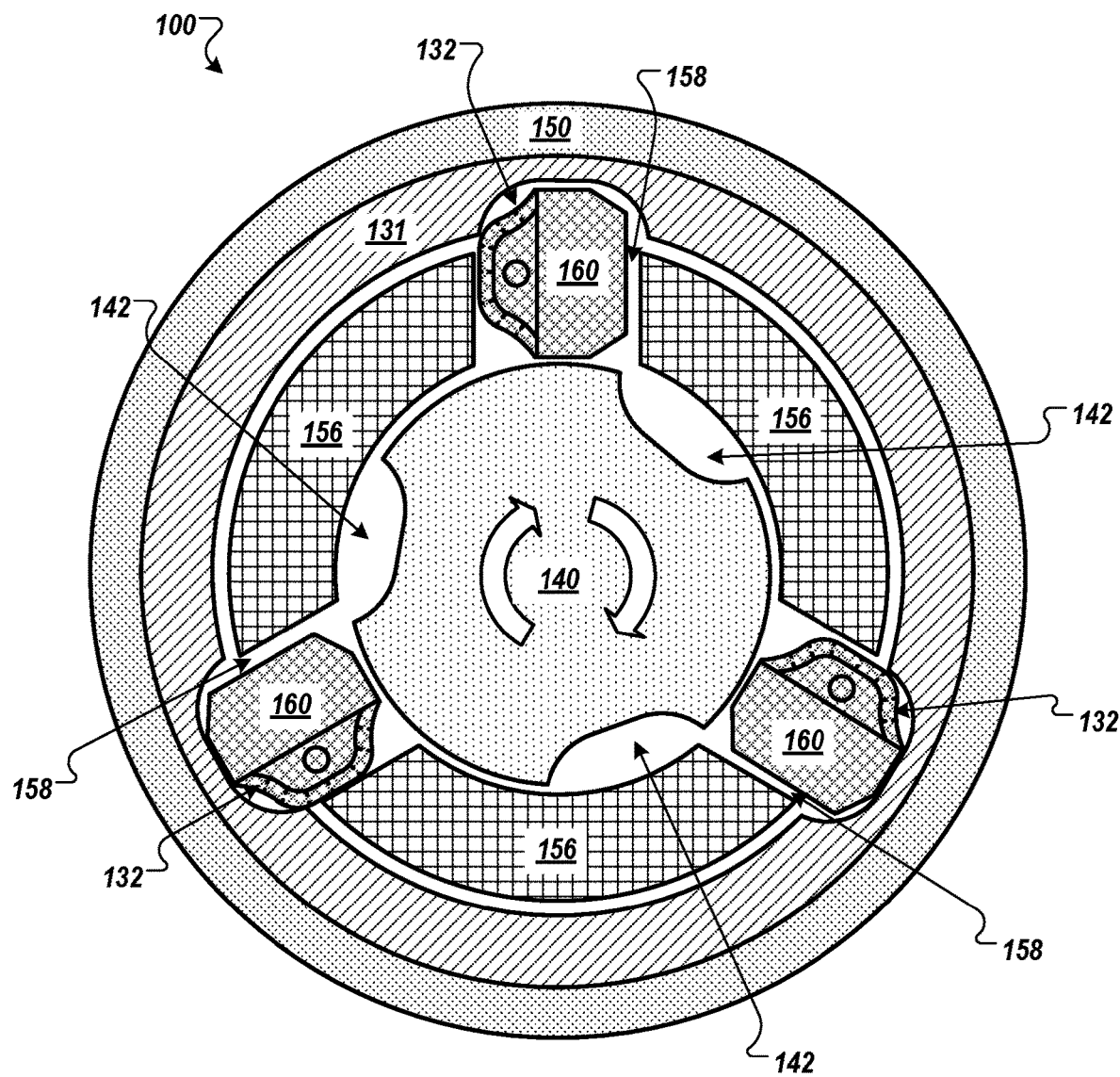
FIG. 6 shows an axial cross section view of the example locking rotary actuator assembly of FIG. 5.

FIGS. 5 and 6 show a longitudinal cross section and an axial cross section, respectively, of the example locking rotary actuator assembly 100 in an example unlocked configuration. In the illustrated configuration, lock keys 160 have been radially displaced from the locked configuration (e.g., as shown in FIGS. 1-2) to an unlocked configuration. In the illustrated configuration, the lock keys 160 are unable to provide substantial mechanical interference with the recesses 142, which allows the rotary output assembly 140 to rotate (e.g., based on torque provided by the motor 101 and transferred through the sun gear assembly 110 and the planet carrier 124). In some embodiments, if one or more of the lock keys 160 were to exhibit inadvertent radially inward movement, then rotation of the rotary output assembly 140 would push the lock keys radially outward again.

Locking of the locking rotary actuator assembly 100 can be accomplished by substantially reversing the direction of the motor 101, which in turn can cause a reversal of the unlocking operations. The lock rotor assembly 131 can be rotated back toward the example configuration shown in FIGS. 1-2. As the ring gear rotates, radially angled ramps on the lock key crown match angled ramps on the inner diameter of the lock rotor assembly 131, and the lock keys 160 are urged out of the recesses 132, radially inward toward the rotary output assembly 140 and into the recesses 142. In some embodiments, a bias member (e.g., a torsion spring) can be configured to bias rotation of the ring gear assembly 130 and the lock rotor assembly 131 toward the locked configuration. With the lock keys 160 in the example positions shown in FIGS. 1-2, the lock rotor assembly 131 can rotate into the locked lock rotor configuration (e.g., against a lock hard stop) with the recesses 132 out of alignment with the guide slots 158, preventing radial escapement of the lock keys from the recesses 142 and maintaining mechanical interference against rotation of the rotary output assembly 140.

Figure 7:
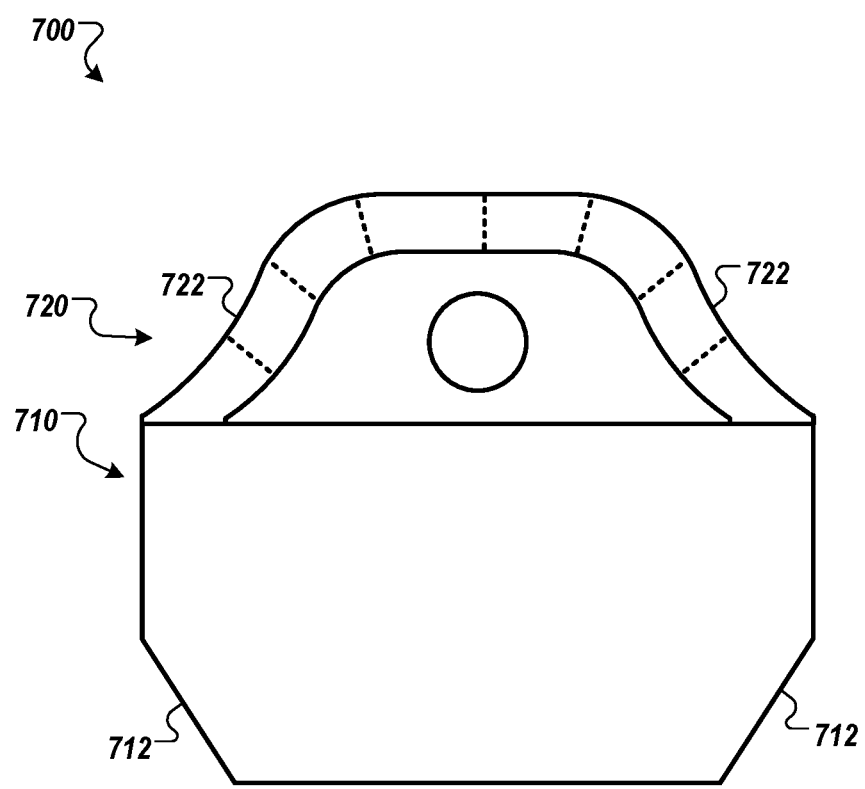
FIG. 7 shows an example lock key.

FIG. 7 shows an example lock key 700. In some embodiments, the lock key 700 can be the example lock key 160 of FIGS. 1-6. The lock key 700 includes a key body 710 and a key crown 720.

The key body 710 includes radially angled ramps 712. In some embodiments, the radically angled ramps 712 can be configured to substantially complement the angles of the rotational recess faces 138 and/or 148 of the recesses 132 and/or 142. In some embodiments, the radically angled ramps 722 can have (or can average) about a angle. In some embodiments, the ramps 138 can be undercut (inverse) lobes having radial ramp angles (e.g., approximately 25 degrees) that can substantially complement the ramp angle on the key crown 720.

The key crown 720 includes radially angled ramps 722. In some embodiments, the radically angled ramps 722 can be configured to substantially complement the angles of the rotational recess faces 136 and/or 146 of the recesses 132 and/or 142. In some embodiments, the radically angled ramps 722 can have (or can average) about a 30° angle.

Figure 8:
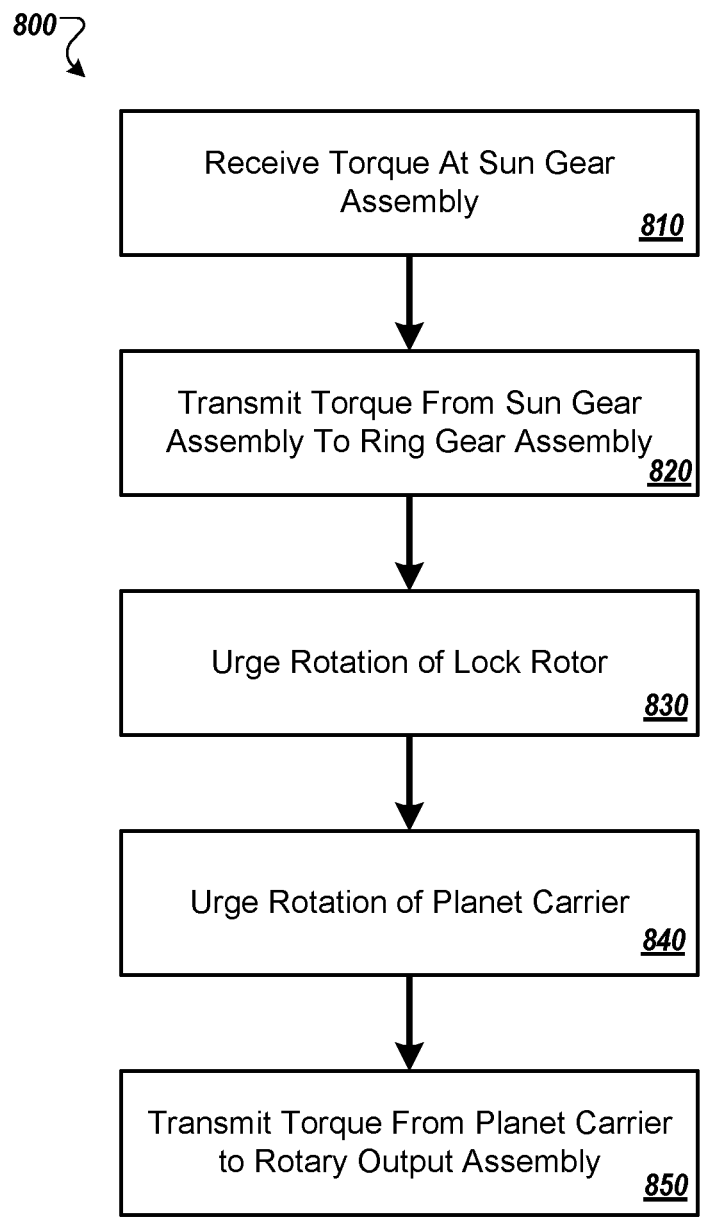
FIG. 8 is flow chart that shows an example of a process for unlocking an example locking actuator assembly.

FIG. 8 is flow chart that shows an example of a process 800 for unlocking an example locking actuator assembly. In some implementations, the process 800 can be performed by all or part of the example assembly 100 of FIGS. 1-6.

At 810, torque is received at a sun gear assembly of an epicyclic gear assembly. For example, the motor 101 can urge rotation of the sun gear assembly 110. In some implementations an electric motor can provide the torque at the sun gear assembly. For example, the motor 101 can be an electric motor.

At 820, torque is transmitted from the sun gear assembly to a ring gear assembly of the epicyclic gear assembly through a collection of planet gears of a planet gear assembly of the epicyclic gear assembly. For example, rotation of the sun gear assembly 110 can urge rotation of the planet gears 122 and the ring gear assembly 130.

At 830, rotation of a lock rotor is urged based on rotation of the ring gear assembly. For example, as the ring gear assembly 130 rotates, the lock rotor assembly 131 also rotates.

In some implementations, the process 800 can include contacting, based on movement of the rotary output assembly, the lock key with an radial groove face of a groove defined in the rotary output assembly and configured to receive the lock key in the first lock key configuration, preventing rotary movement of the rotary output assembly based on interference between the lock key and the radial groove face, preventing rotation of the planet gear assembly based on the prevented rotary movement of the rotary output assembly, and transmitting substantially all torque received at the sun gear assembly to the ring gear assembly. For example, when the rotary output assembly 140 is locked, the lock keys 160 contact the rotational recess faces 136, 138, 146, and/or 148 to prevent rotation of the rotary output assembly, which can cause substantially all of the torque provided by the motor 101 to be transmitted to the ring gear assembly 130.

In some implementations, the process 800 can include rotating the lock rotor from a first lock rotor configuration to a second lock rotor configuration. For example, the lock rotor assembly 131 can be rotated from the example configuration shown in FIGS. 1-2 to the example configuration shown in FIGS. 3-6. In some implementations, the first lock rotor configuration can be a first rotational position defined by a first lock rotor end stop configured to interfere with rotation of the lock rotor in a first direction, and the second lock rotor configuration can be a second rotational position defined by a second lock rotor end stop configured to interfere with rotation of the lock rotor in a second direction opposite the first direction.

In some implementations, the process 800 can include configuring the lock rotor to prevent radial displacement of a lock key from a first key configuration to a second key configuration in the first lock rotor configuration, and configuring the lock rotor to permit radial displacement of the lock key from the first key configuration to the second key configuration in the second lock rotor configuration.

At 840, rotation of a planet carrier is urged by orbital motion of the planet gears about the sun gear assembly. For example, rotation of the sun gear assembly 110 can urge rotation of the planet carrier 124.

At 850, torque is transmitted from the planet carrier to a rotary output assembly. For example, rotation of the planet carrier 124 can urge rotation of the rotary output assembly 140.

In some implementations, the process 800 can include urging radial displacement of a lock key from a first lock key configuration to a second lock key configuration based on rotary movement of the rotary output assembly. For example, in the example unlocked configuration of FIGS. 2-6, rotation of the rotary output member 140 can urge radial displacement of the lock keys 160 from the recesses 142.

Although a few implementations have been described in detail above, other modifications are possible. For example, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A rotary lock assembly comprising:
   an epicyclic gear assembly comprising:
      a sun gear assembly;
      a ring gear assembly; and
      a planet gear assembly comprising:
         a plurality of planet gears mechanically engaged to the sun gear assembly and the ring gear assembly; and
         a planet carrier mechanically engaged to the planet gears and configured to be rotated by the planet gears;
   a lock rotor configured to be rotated by the ring gear assembly;
   a lock key; and
   a rotary output assembly configured to be rotated by the planet carrier and urge radial displacement of the lock key from a first lock key configuration to a second lock key configuration based on rotary movement of the rotary output assembly.

2. The rotary lock assembly of claim 1, wherein the sun gear assembly is configured to be rotated by a rotary power source.

3. The rotary lock assembly of claim 1, wherein the ring gear assembly comprises the lock rotor.

4. The rotary lock assembly of claim 1, further comprising an electric motor configured to urge rotation of the sun gear assembly.

5. The rotary lock assembly of claim 1, and a second lock key configuration, wherein the lock rotor is configured to be rotated by the ring gear assembly between a first lock rotor configuration in which radial displacement of the lock key from the first lock key configuration to the second lock key configuration is prevented, and a second lock rotor configuration in which radial displacement of the lock key from the first lock key configuration to the second lock key configuration is permitted.

6. The rotary lock assembly of claim 5, further comprising a first lock rotor stop configured to prevent rotation of the lock rotor in a first direction at the first lock rotor configuration, and a second lock stop configured to prevent rotation of the lock rotor in a second direction at the second lock rotor configuration.

7. The rotary lock assembly of claim 5, wherein the rotary output assembly is configured for rotary movement relative to radial movement of the lock key, and having an outer surface defining a recess between a first rotational recess face and a second rotational recess face, and configured to receive the lock key in the first lock key configuration and be prevented from rotating based on mechanical interference between the lock key and at least one of the first rotational recess face and the second rotational recess face.

8. The rotary lock assembly of claim 5, further comprising:
a housing; and
a key guide grounded to the housing and having a radial slot configured to provide radial guidance for the radial displacement of the lock key and prevent rotational movement of the lock key within the housing.

9. The rotary lock assembly of claim 5, further comprising a bias member configured to bias rotation of the lock rotor toward the first lock rotor configuration.

10. A method of locking a linear actuator, the method comprising:
receiving torque at a sun gear assembly of an epicyclic gear assembly;
transmitting torque from the sun gear assembly to a ring gear assembly of the epicyclic gear assembly through a plurality of planet gears of a planet gear assembly of the epicyclic gear assembly;
urging rotation of a lock rotor based on rotation of the ring gear assembly;
urging rotation of a planet carrier by orbital motion of the planet gears about the sun gear assembly;
urging radial displacement of a lock key from a first lock key configuration to a second lock key configuration based on rotary movement of a rotary output assembly; and
transmitting torque from the planet carrier to the rotary output assembly.

11. The method of claim 10, further comprising providing, by an electric motor, torque at the sun gear assembly.

12. The method of claim 10, further comprising:
contacting, based on movement of the rotary output assembly, the lock key with a radial groove face of a groove defined in the rotary output assembly and configured to receive the lock key in the first lock key configuration;
preventing rotary movement of the rotary output assembly based on interference between the lock key and the radial groove face;
preventing rotation of the planet gear assembly based on the prevented rotary movement of the rotary output assembly; and
transmitting substantially all torque received at the sun gear assembly to the ring gear assembly.

13. The method of claim 10, further comprising rotating the lock rotor from a first lock rotor configuration to a second lock rotor configuration.

14. The method of claim 13, wherein the first lock rotor configuration is a first rotational position defined by a first lock rotor end stop configured to interfere with rotation of the lock rotor in a first direction, and the second lock rotor configuration is a second rotational position defined by a second lock rotor end stop configured to interfere with rotation of the lock rotor in a second direction opposite the first direction.

15. The method of claim 13, wherein the lock rotor is configured to prevent radial displacement of a lock key from a first key configuration to a second key configuration in the first lock rotor configuration, and is configured to permit radial displacement of the lock key from the first key configuration to the second key configuration in the second lock rotor configuration.

16. A rotary actuator comprising:
a housing;
a rotary input member rotatably moveable relative to the housing;
a rotary output member rotatably moveable between a first output position relative the housing, and a second output position relative to the housing; and
a rotary lock assembly disposed within the housing and comprising:
a first epicyclic gear assembly comprising:
a sun gear assembly;
a ring gear assembly; and
a planet gear assembly comprising:
a plurality of planet gears mechanically engaged to the sun gear assembly and the ring gear assembly; and
a planet carrier mechanically engaged to the planet gears and configured to be rotated by the planet gears;
a lock rotor configured to be rotated by the ring gear assembly;
a lock key; and
a rotary output assembly configured to be rotated by the planet carrier and urge radial displacement of the lock key from a first lock key configuration to a second lock key configuration based on rotary movement of the rotary output assembly.

17. The rotary actuator of claim 16, further comprising an electric motor configured to urge rotation of the sun gear assembly.

18. The rotary actuator of claim 16, wherein the lock rotor is configured to be rotated by the ring gear assembly between a first lock rotor configuration in which radial displacement of the lock key from the first lock key configuration to the second lock key configuration is prevented, and a second lock rotor configuration in which radial displacement of the lock key from the first lock key configuration to the second lock key configuration is permitted.

19. The rotary actuator of claim 18, wherein the rotary lock assembly further comprises a first lock rotor stop configured to prevent rotation of the lock rotor in a first direction at the first lock rotor configuration, and a second lock stop configured to prevent rotation of the lock rotor in a second direction at the second lock rotor configuration.

20. The rotary actuator of claim 18, wherein the rotary output member is configured for rotary movement relative to radial movement of the lock key, and the rotary output member comprises an outer surface defining a groove between a first radial groove face and a second radial groove face, and configured to receive the lock key in the first lock key configuration and be prevented from rotating based on mechanical interference between the lock key and at least one of the first radial groove face and the second radial groove face.

\* \* \* \* \*

UNITED STATES PATENT AND TRADEMARK OFFICE
CERTIFICATE OF CORRECTION

PATENT NO. : 12,196,277 B2
APPLICATION NO. : 17/811458
DATED : January 14, 2025
INVENTOR(S) : Joseph Thomas Kopecek Page 1 of 1

It is certified that error appears in the above-identified patent and that said Letters Patent is hereby corrected as shown below:

In the Claims

Column 8, Line 66-67, Claim 5, after "claim 1," please delete "and a second lock key configuration,".

Signed and Sealed this
Eighth Day of April, 2025

Coke Morgan Stewart
*Acting Director of the United States Patent and Trademark Office*